United States Patent [19]

Etievant et al.

[11] Patent Number: 5,363,053
[45] Date of Patent: Nov. 8, 1994

[54] ELECTROSTATIC ACCELERATOR AND FREE ELECTRON BEAM LASER USING THE ACCELERATOR

[75] Inventors: Claude Etievant, Versailles; Michel Roche, Dijon, both of France

[73] Assignee: Commissariat a l'Energie Atomique, Paris, France

[21] Appl. No.: 925,664

[22] Filed: Aug. 7, 1992

[30] Foreign Application Priority Data

Aug. 28, 1991 [FR] France .................. 91 10672

[51] Int. Cl.$^5$ .................. H01S 3/00; H05H 15/00
[52] U.S. Cl. .................. 315/506; 315/500; 372/2; 372/74
[58] Field of Search .................. 328/233, 227, 228; 372/2, 74

[56] References Cited

U.S. PATENT DOCUMENTS

| | | | |
|---|---|---|---|
| 4,085,376 | 4/1978 | Abramyan et al. | 328/233 |
| 4,361,812 | 11/1982 | Farrell et al. | |
| 4,367,551 | 1/1983 | Gover | 372/2 |
| 5,095,486 | 3/1992 | Etievant | 372/2 |
| 5,107,221 | 4/1992 | N'Guyen et al. | |

FOREIGN PATENT DOCUMENTS

| | | |
|---|---|---|
| 0410880 | 1/1991 | European Pat. Off. |
| 8707378 | 5/1987 | France |
| 8910144 | 7/1989 | France |

OTHER PUBLICATIONS

De la Physique des particules a l'agroalimentaire, La Recherche, Dec. 1990, vol. 21, p. 1464.
Electrostatic-accelerator free-electron lasers by Luis R. Elias 28/SPIE vol. 738 Free-Electron Lasers (1987).
Electrostatic Accelerators For Free Electron Lasers by Luis R. Elias (1990) 0168-9002/90/03.50 Elsevier Science Publishers B. V. (North-Holland) pp. 79-86.
The New UCSB Compact Far-Infrared Fel* 0168-9002/8803.50 Elsevier Science Publishers B. V. (North Holland Physics Publishing Division) pp. 81-88 (1988).
A Charging System for the Vivitron by Jean-Marie Helleboid 0168-9002/90/03.50 Elsevier Science Publishers B. V. pp. 99-102 (1990).
Pelletron Accelerators For Very High Voltage By R. G. Herb pp. 267-276 (1974).
Performance and Operational Characteristics of the Yale Tandem Accelerator* by K. Sato, J. A. Benjamin, C. E. L. Gingell, P. D. Parker and D. A. Bromley pp. 129-142 (1974).
The Nuclear Structure Facility at Daresbury by T. W. Aitken, B. S. Halliday, W. T. Johnstone, C. W. Jones, T. Joy, M. C. Morris, N. R. S. Tait and R. G. P. Voss pp. 235-265, 1974.
Nuclear Instruments & Methods in Physics Research, vol. A-237, No. ½, Jun. 15, 1985, pp. 203-206, L. Elias, et al., "The UCSB Electrostatic Accelerator Free Electron Laser: First Operation".
Nuclear Instruments & Methods in Physics Research, vol. A279, No. 3, Jul. 15, 1989, pp. 646-654, I. Boscolo, et al., "A Small Electrostatic Accelereator for a Powerful Continous-Wave Free Electron Laser".
Patent abstracts of Japan, vol. 15, No. 419, (E-1126) [4947], Oct. 24, 1991, & JP-A-3-173491, Jul. 26, 1991, K. Inoue, et al., "Free-Electron Laser Device Using Electrostatic Accelerator".

*Primary Examiner*—Donald J. Yusko
*Assistant Examiner*—N. D. Patel
*Attorney, Agent, or Firm*—Oblon, Spivak, McClelland, Maier & Neustadt

[57] ABSTRACT

Electrostatic accelerator includes an accelerating column (20), a high voltage terminal (18) located at one end of said accelerating column and electric charge transport means, said transport means incorporating a high frequency accelerator such as a high frequency electron accelerator (54) able to supply an electron beam and means (56) for supplying the electron beam to the high voltage terminal, said electric charges being constituted by the electrons supplied by said high frequency accelerator.

13 Claims, 8 Drawing Sheets

ELECTROSTATIC ACCELERATOR AND FREE ELECTRON BEAM LASER USING THE ACCELERATOR

BACKGROUND OF THE INVENTION

1. Field of the Invention

The present invention relates to an electrostatic accelerator incorporating an accelerating column, a high voltage terminal at one end of said accelerating column and electric charge transport means.

2. Discussion of the Background

Such electrostatic accelerators of the Van de Graaf type are already known and have been used for accelerating ions in various nuclear physics research projects. Electrostatic accelerators also have other applications, particularly in the field of free electron lasers.

Electrostatic accelerators have numerous advantages in the latter field. They supply pulses, whose durations are very long compared with those of the pulses supplied by pulse-type or high frequency accelerators. The spectral width of the line emitted by a free electron laser associated with an electrostatic accelerator is very small. The quality of the electron beam accelerated by an electrostatic accelerator is excellent and well adapted to the requirements of free electron lasers. Such an accelerator makes it possible to recover with high efficiency the energy of the electron beam, following the passage of said beam through the cavity of said free electron laser associated with said accelerator. Due to the possibility of recovering the energy of the electron beam, the overall efficiency of the free electron laser is very high.

However, a Van de Graaf-type electrostatic accelerator still suffers from a disadvantage. The electric charge transport means incorporated in such an accelerator are in the form of a belt or some other mechanical transport device, such as e.g. a Pelletron or Laddertron. Therefore, in such an accelerator, the value of the charging current (current corresponding to said electric charges) is low.

SUMMARY OF THE INVENTION

The object of the present invention is to obviate this disadvantage and improve the performance characteristics of a Van de Graaf-type electrostatic accelerator by increasing its charging current to well beyond the threshold permitted by the known transport means such as e.g. belts or Pelletrons.

To do this, the present invention uses a beam of electric charges (such as electrons or negative ions or positive ions) in place of a mechanical charge transport means.

Specifically, the electrostatic accelerator according to the invention comprising an accelerating column, a high voltage terminal located at one end of said accelerating column and means for the transport of the electric charges is characterized in that the transport means incorporate a high frequency accelerator able to supply a beam of electric charges in order to form the charging current of the electrostatic accelerator.

According to a preferred embodiment of the invention, the high frequency accelerator is a high frequency electron accelerator able to supply an electron beam and the electric charge transport means also incorporate means for supplying the electron beam to the high voltage terminal in which said electrons accumulate, said electric charges being constituted by the electrons supplied by said high frequency accelerator.

By using such electric charge transport means, the present invention makes it possible to multiply by at least ten the threshold of the charging current permitted by known electrostatic accelerators.

An electrostatic accelerator according to the invention is able to produce an accelerated electron beam (main beam), whose current is very high, e.g. approximately 1 to 20 A, by recycling said electron beam and storing charges in the capacitance of the high voltage terminal of said accelerator.

When using same with a free electron laser, recycling the main electron beam is provided a very high efficiency exceeding 90%, following the passage of said beam into the laser, allowing the latter to operate with a high intensity main electron beam (1 to 20 A), whilst maintaining the charging current at a very low value of approximately 0.5 to a few mA in an exemplified manner.

As it is possible to compensate part of the losses of the main electron beam by a low voltage electric generator placed in the high voltage terminal of the electrostatic accelerator, it is sufficient for the charging current of the latter to compensate the electrons lost in the magnetic wiggler of the free electron laser and in the structures in which the main electron beam is propagated. Therefore the ratio of the intensity of the charging current to the intensity of the main electron beam supplied by the electrostatic accelerator can have a very low value of approximately $2 \times 10^{-4}$ to $3 \times 10^{-4}$.

A high frequency accelerator having conventional performance characteristics is able to supply a charging current of this type to an electrostatic accelerator, whose performance characteristics are far higher then those of the high frequency accelerator.

According to a special embodiment of the electrostatic accelerator according to the invention, the high frequency accelerator thereof is constituted by a structure having a cavity formed by an external cylindrical conductor and an internal cylindrical conductor, which are coaxial to one another, a high frequency source supplying the cavity with an electromagnetic field at a resonant frequency of the cavity, the radial component of the field having a maximum in at least one plane perpendicular to the axis common to the external conductor and the internal conductor, said external and internal conductors of the cavity having diametrically opposite openings located in the plane for the introduction of the electron beam into the cavity and its extraction in said plane, whereby said high frequency accelerator also comprises at least one electron deflector able to deflect the electron beam having traversed the cavity along a diameter, whilst keeping it in the plane and it is then reinjected into the cavity along another diameter.

A high frequency accelerator with this structure is called the Rhodotron (registered trademark).

Such an accelerator is described in documents (1) to (3) which, like the other documents cited hereinafter, are referred to at the end of the present description.

In an electrostatic accelerator according to the invention, the electron beam supply means can comprise a column for decelerating the electrons from the high frequency accelerator.

The electrostatic accelerator according to the invention can accelerate electrons and also have means for recovering electrons which it has accelerated and which have then been used, said recovery means incorporating a column for decelerating the electrons which have been used.

In this case, according to an advantageous embodiment of said electrostatic accelerator it is possible to simplify the structure of the latter and therefore reduce its cost. The three columns, namely the accelerating column, the decelerating column of the supply means and the decelerating column of the recovery means have the same structure. The electrostatic accelerator comprises a single tube in which the three columns are grouped and which serves to accelerate electrons to be supplied by said electrostatic accelerator for the deceleration of electrons from the high frequency accelerator and for the deceleration of electrons which have been used.

The electrostatic accelerator according to the invention is in particular used for producing a free electron laser.

The present invention also relates to a free electron laser incorporating an electron electrostatic accelerator able to supply an electron beam and a magnetic wiggler which is traversed by said electron beam, said free electron laser being characterized in that the electrostatic accelerator is that forming the object of the present invention and which incorporates a high frequency electron accelerator.

Finally, when the electrostatic accelerator according to the invention comprises the aforementioned recovery means, the latter can recover the electrons which have traversed the magnetic wiggler, the decelerating column of the recovery means being linked with said magnetic wiggler.

BRIEF DESCRIPTION OF THE DRAWINGS

The invention is described in greater detail hereinafter relative to non-limitative embodiments and the attached drawings.

Figure 1:
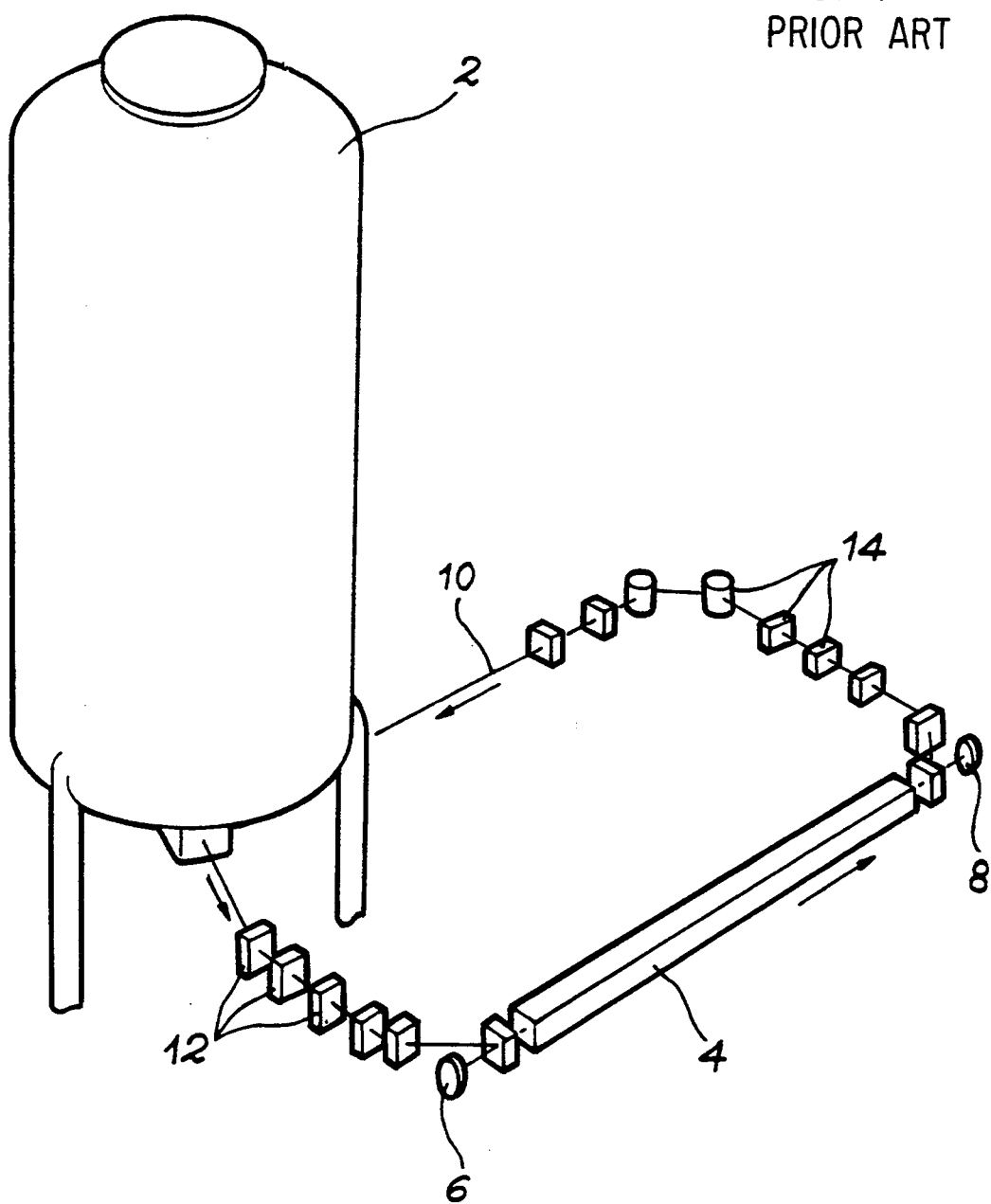
FIG. 1 A diagrammatic view of a known free electron laser system, which has a known electrostatic accelerator of the Van de Graaf type.

The free electron laser system diagrammatically shown in FIG. 1 and which has a known Van de Graaf-type electrostatic accelerator is installed at the University of California - Santa Barbara (UCSB).

Figure 2:
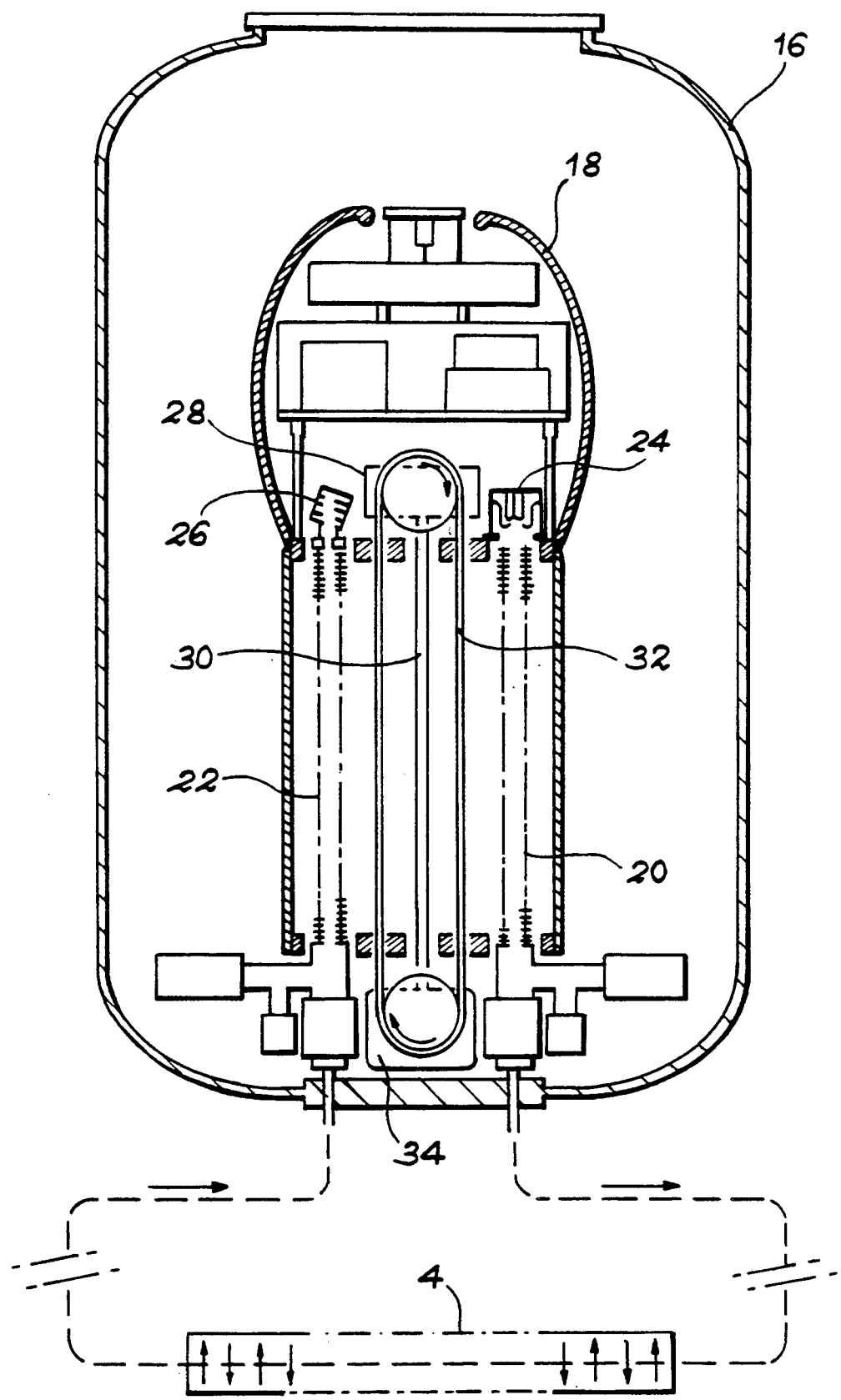
FIG. 2 A diagrammatic view of the electrostatic accelerator forming part of the system shown in FIG. 1.

FIG. 2 is a diagrammatic view of said known electrostatic accelerator.

With regards to electrostatic accelerators for free electron lasers and in particular with regards to the free electron laser system installed at the University of California - Santa Barbara, reference should be made to documents (4) to (7).

The free electron laser system diagrammatically shown in FIG. 1 comprises a Van de Graaf-type electrostatic accelerator 2, a magnetic wiggler 4 forming part of the free electron laser, mirrors 6 and 8, which are parallel to one another and on either side of the wiggler 4 and which form a resonant cavity, a duct 10 in which is formed a vacuum and in which is propagated the electron beam produced by the electrostatic accelerator 2, part of said duct 10 emanating from said accelerator 2 and extends to one side of the wiggler, whilst the other part of said duct 10 emanates from the other side of the wiggler and returns to the electrostatic accelerator 2, as well as various transport and matching means placed along the duct 10. Certain of the said means 12 are provided for transporting the electron beam in the duct 10 and for matching said beam to the wiggler-resonator system of the free electron laser. The remainder 14 of said means transports up to the accelerator 2 the electron beam from the wiggler 4 and also serve to match said beam to the decelerating tube of the electrostatic accelerator 2.

Thus, the electron beam produced by the electrostatic accelerator 2 traverses the wiggler 4, where it is able to produce a coherent light beam and then returns to the electrostatic accelerator 2. The latter is placed in a sealed enclosure 16 (cf. FIG. 2) filled with gaseous $SF_6$.

This electrostatic accelerator 2 comprises a high voltage terminal 18 raised to a potential of −3 MV, an accelerating tube 20 or accelerating column placed at the end of the high voltage terminal and which accelerates the electron beam produced by the accelerator 2 and which is called the main beam and a decelerating tube 22 or decelerating column, which recovers the main beam after the passage of the latter into the wiggler 4 and which decelerates said main electron beam. This decelerating tube 22 is also placed outside the high voltage terminal.

The electrostatic accelerator also comprises within the high voltage terminal 18 an electron gun 24 and means for the electric power supply of the latter which are not shown, said electron gun being ale to produce a 50 keV electron beam, said electrons then being accelerated in the accelerating tube 20, an electron collector 26, together with not shown means for polarizing the electrodes of said collector 26 to appropriate voltages of respectively −40, −43.3, −46.7 and −50 kV, said electron accelerator collecting the electrons of the main beam when the latter has passed through the decelerating tube and a 10 kW electric generator 28 for supplying the various equipments within the high voltage terminal 18.

The electrostatic accelerator 2 also comprises a rotary shaft 30 made from an electrically insulating material and which is able to withstand a 3 MV potential difference between said ends, said shaft mechanically driving the generator 28 raised to the high voltage of 3 MV and a Pelletron chain 32 supplying to the high voltage terminal 18 a current of approximately 500 microamperes, so as to compensate the electron losses of the main beam in the loop traversed by the latter between the accelerating column 20 and the decelerating column 22, together with a motor 34 driving said Pelletron chain 32.

It is pointed out that the diagram of FIG. 2 is extracted from document (4).

As has been stated, it is known to use a belt for transporting electric charges from the earth of ground potential to the high voltage in a Van de Graaf-type electrostatic accelerator. Reference should be made in this connection to document (8).

In order to transport the electric charges, such a belt can be replaced by a Pelletron chain, as is the case in the system used by the University of California, Santa Barbara.

Other Pelletron chains are known, e.g. that of the National Electrostatic Corporation/U.S.A. (N.E.C.) and in which connection reference can be made to document (9) and that used in quantities in the tandem accelerator of the University of Yale (cf. document (10)).

A mechanical device for transporting electric charges comparable to the Pelletron and which is called the Laddertron is also known. The latter is used in the Daresbury tandem accelerator (cf. document (11)).

Figure 3:
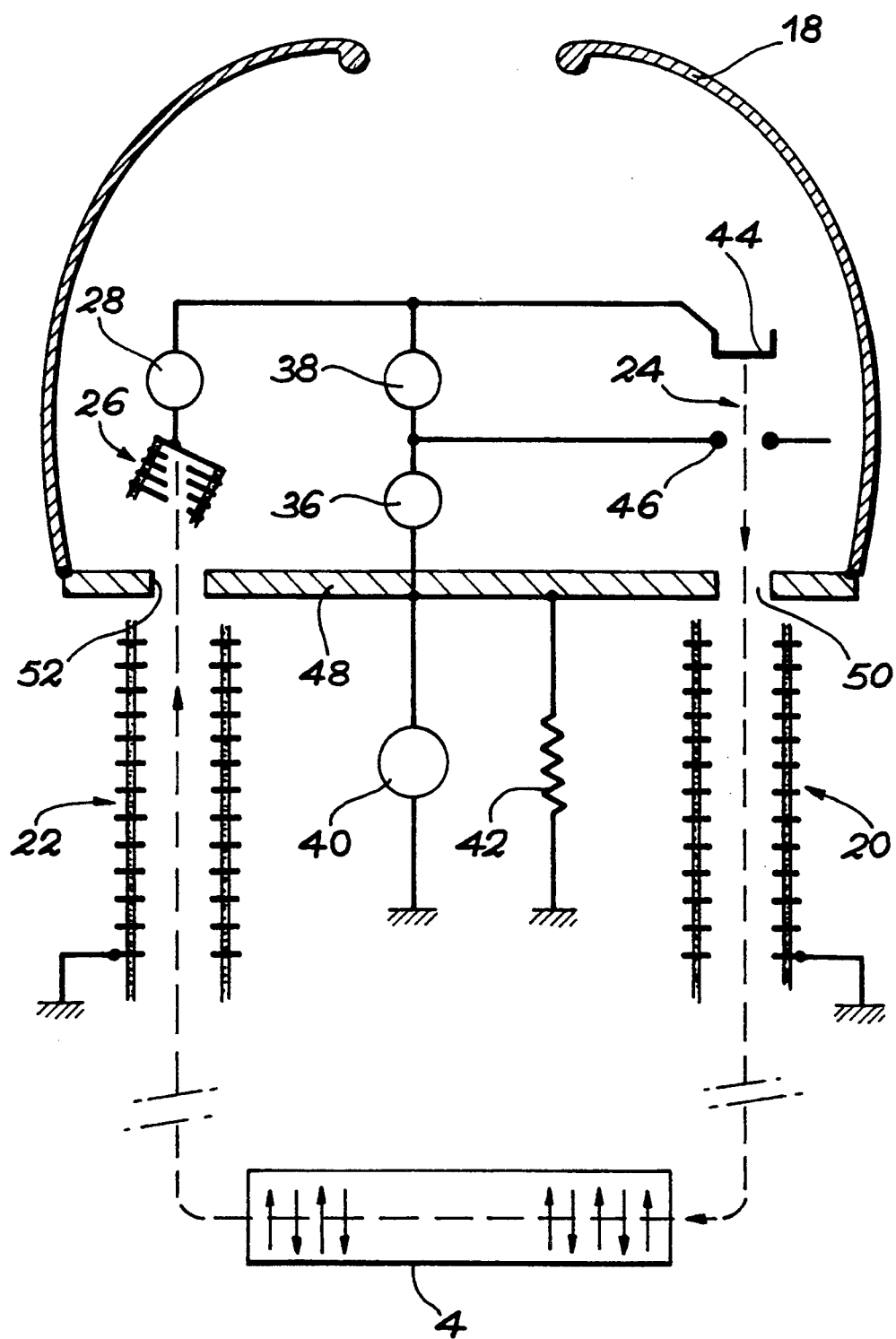
FIG. 3 The circuit diagram of an electrostatic accelerator of the type shown in FIG. 2.

The circuit diagram of a Van de Graaf-type electrostatic accelerator with electron beam recovery of the type used in the free electron laser system installed at the University of California - Santa Barbara is shown in FIG. 3, wherein the high voltage terminal 18 is raised to an electric potential U compared with earth or ground. The potential U is e.g. $-3$ MV, as stated hereinbefore.

The high voltage terminal 18 contains the electron gun 24, the beam collector 26, the power generator 28 (10 kW generator in the embodiment shown in FIG. 2) together with a first generator 36 and a second generator 38 for adjusting the polarization voltages of the electrodes of the electron gun 24.

In the diagram of FIG. 3, it is also possible to see outside the high voltage terminal 18, the accelerating tube 20, the decelerating tube 22, a charging generator 40 which, in the case of FIG. 2, is constituted by the Pelletron chain 32, a leakage circuit 42 corresponding to a discharge by the corona effect, as well as the polarization resistors of the accelerating tube 20 and the decelerating tube 22 and the wiggler 4 of the free electron laser using the electrostatic accelerator.

The electron gun 24 comprises an electron emitting cathode 44 and an electrode 46 for accelerating the electrons emitted by the cathode 44.

The generator 28 keeps constant the electrical potential of each of the collecting plates of the collector 26 compared with the potential of the electron gun cathode 44.

FIG. 3 also shows an electrically conductive plate 48, which closes the high voltage terminal 18 and which is raised to the potential U. The electrons emitted by the cathode 44 are accelerated by the electrode 46 and then pass through an outlet hole 50 of the plate 48. The electrons then successively traverse the accelerating tube 20, the wiggler 4 and the decelerating tubes 22. The electrons then traverse an intake hole 52 of the plate 48 and are recovered by the collector 26.

As can be seen in FIG. 3, the branch of the circuit diagram on which is located the charge generator 40 is grounded at one side and at potential U on the other. The intensity of the current supplied by the charging generator 40 is designated Ich. The intensity of the current of the electron beam from the accelerator shown in FIG. 3 is designated I and the intensity of the recycling current corresponding to the electron beam recovered by said accelerator is designated Ir. The leakage circuit 42 is grounded on one side, whilst the other is at potential U. The intensity of the leakage current corresponding thereto is designated If.

The generators 28, 36 and 38 are driven by a rotary shaft which is not shown in FIG. 3, but which is visible in FIG. 2 (reference 30). The generators 36 and 38 belong to the same branch of the circuit of FIG. 3 and the generator 38 is connected on one side to the generator 36 and on the other side is raised to the same potential as the cathode 44 of the electron gun 24. The accelerating electrode 46 is connected to the terminal common to the generators 36 and 38. Therefore the generator 36 is connected on one side to the generator 38 and to the electrode 46 and on the other side is raised to the potential of the plate 48 (potential U).

It is possible to define the recovery rate or level n of the electrostatic accelerator of FIG. 3 as the ratio Ir/I.

In the system installed at the University of California - Santa Barbara, said recovery rate is approximately 0.95 to 0.97, when the free electron laser operates.

An increase in the intensity Ich of the charging current of the electrostatic accelerator makes it possible to reduce the time interval between two pulses of the electron gun 24. Such an increase also makes it possible to improve the spectral stability of the light pulses emitted by the free electron laser associated with the electrostatic accelerator shown in FIG. 3.

In a known, Van de Graaf-type electrostatic accelerator like that shown in FIG. 3, the intensity i1 of the current transported by the mechanical charge transport device 40 from earth to the high voltage terminal can be expressed by the following formula:

$$i1 = s \times V$$

in which s represents the line density of the electric charges and V the speed of said mechanical device (speed of the belt, Pelletron chain or Laddertron chain).

In order to increase the intensity of this charging current, it will be necessary to increase the line density of the charges and therefore the width of the charge support (width of the belt or chain plates) and/or increase the electric charge translation speed V. All these increases would lead to technological difficulties (vibrations, transients, wear, increase in size) and to high costs.

According to the present invention, the mechanical charge transport device is replaced by an electric charge beam, preferably an electron beam, which comes from a high frequency accelerator. In this case, the intensity i2 of the current of the electric charges can be expressed by the following formula:

$$i2 = e.N.S.v$$

in which e represents the electrical charge of the electron (in absolute values), N represents the electronic density of the electron beam from the high frequency accelerator, S represents the cross-section of said beam and v represents the electron velocity in said beam.

It can be considered that the velocity of the electrons of the beam is approximately $10^7$ times higher than the speed V of the mechanical charge transport device.

Bearing in mind the considerable ratio between said velocities V and v, the present invention makes it possible to obtain much higher charging currents than those possible with the mechanical charge transport devices of the known, Van de Graaf-type electrostatic accelerators.

In the present invention, for injecting the charging current, it is possible to use the high frequency accelerator known as the Rhodotron and to which reference was made hereinbefore.

Figure 4:
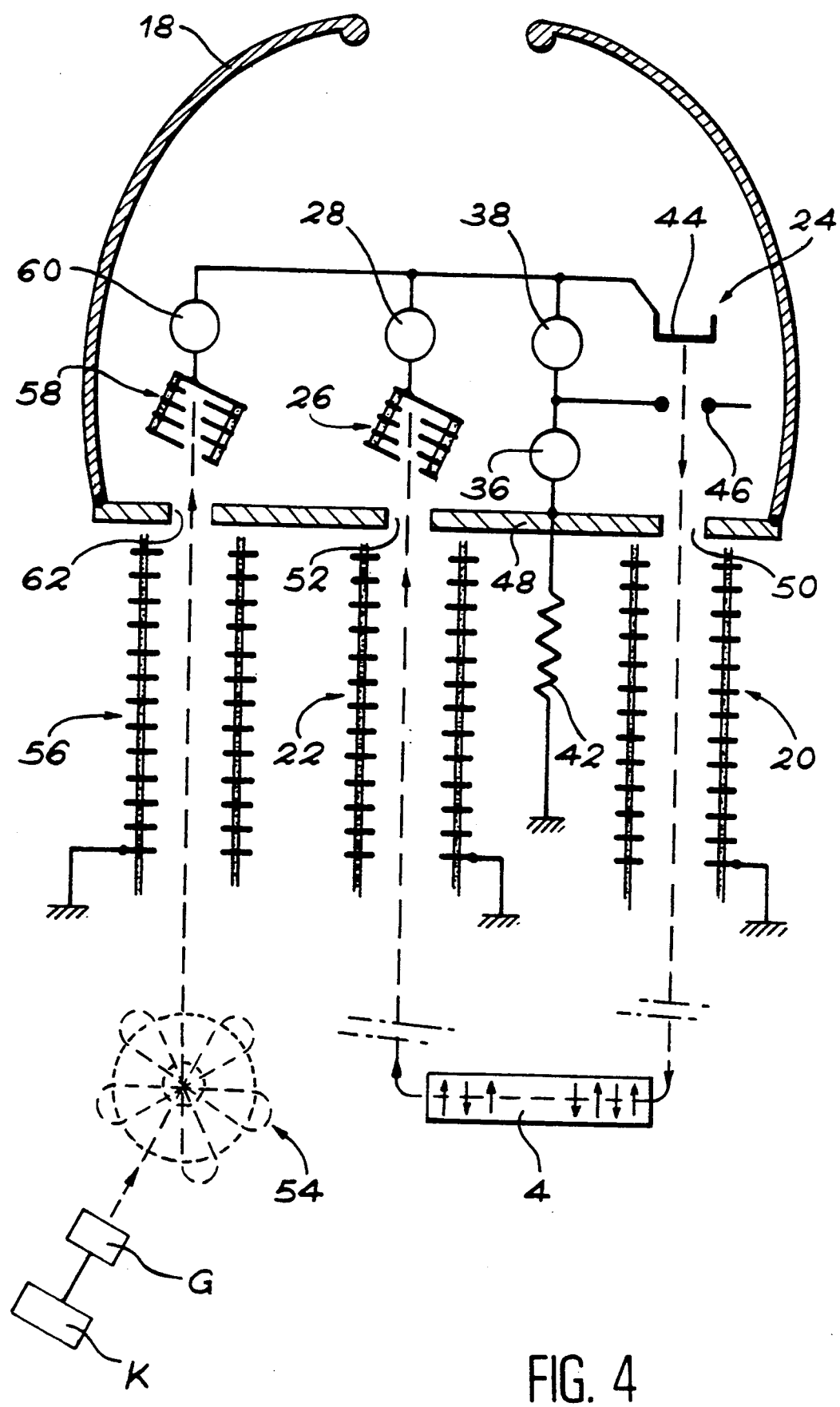
FIG. 4 Diagrammatically a special embodiment of the electrostatic accelerator according to the invention.

The electrostatic accelerator according to the invention and which is shown in FIG. 4 is identical to that shown in FIG. 3, except that the charging generator 40 (e.g. Pelletron chain) is replaced by an assembly incorporating a Rhodotron 54, a supplementary decelerating tube or column 56, a supplementary electron collector 58 and a supplementary generator 60.

In the electrostatic accelerator of FIG. 4, the generators 28, 36 and 38 are still driven by a not shown, electrically insulating rotary shaft, which is itself rotated by a not shown motor. It is also possible to use any other drive mechanism not sensitive to the high voltage.

These generators are remotely voltage-controlled by a device not sensitive to the high voltage, e.g. an infrared control. The generator 28 is preferably controlled by the electromagnetic power emitted by the laser. The high frequency accelerator 54 makes it possible to supply to the high voltage terminal 18 an electron beam having an appropriate intensity and energy.

The decelerating column 56, which is similar to the decelerating column 22, is located outside the high frequency terminal 18 and decelerates the electron beam from the high frequency accelerator 54. The thus decelerated electron beam enters the high voltage terminal by an opening 62 in the conductive plate 48.

The supplementary charge collector 58 is located in the high voltage terminal 18 and is similar to the collector 26. The collector 58 collects the decelerated electron beam, which has penetrated the high voltage terminal 18 by the opening 62.

The supplementary generator 60 keeps constant the electrical potential of each of the collecting plates of the collector 58 compared with the potential of the cathode 44 of the electron gun 24. This generator 60 can be voltage regulated by means of a remote control and is preferably made to follow the energy variations of the beam emitted by the high frequency accelerator 54.

A not shown tube tightly connects the high frequency accelerator 54 to the supplementary decelerating column 56 and the latter is tightly connected to the supplementary collector 58, so as to ensure that the high frequency accelerator 54, supplementary decelerating column 56 and collector 58 form the same tight enclosure.

A not shown pumping system is provided for forming the vacuum in said enclosure (pressure of approximately $10^{-4}$ to $10^{-5}$ Pa). Obviously the main electron beam from the electrostatic accelerator of FIG. 4 and which returns there after traversing the wiggler 4, propagates into another tight enclosure passing from the electron gun 24 to the collector 26, whilst successively traversing the accelerating column 20, the wiggler 4 and the decelerating column 22.

Not shown pumping means are provided on said other tight enclosure in which travels the main electron beam in order to form a vacuum therein.

Appropriate, not shown polarization means are provided for respectively polarizing the different plates of each of the columns 20, 22 and 56.

Figure 5:
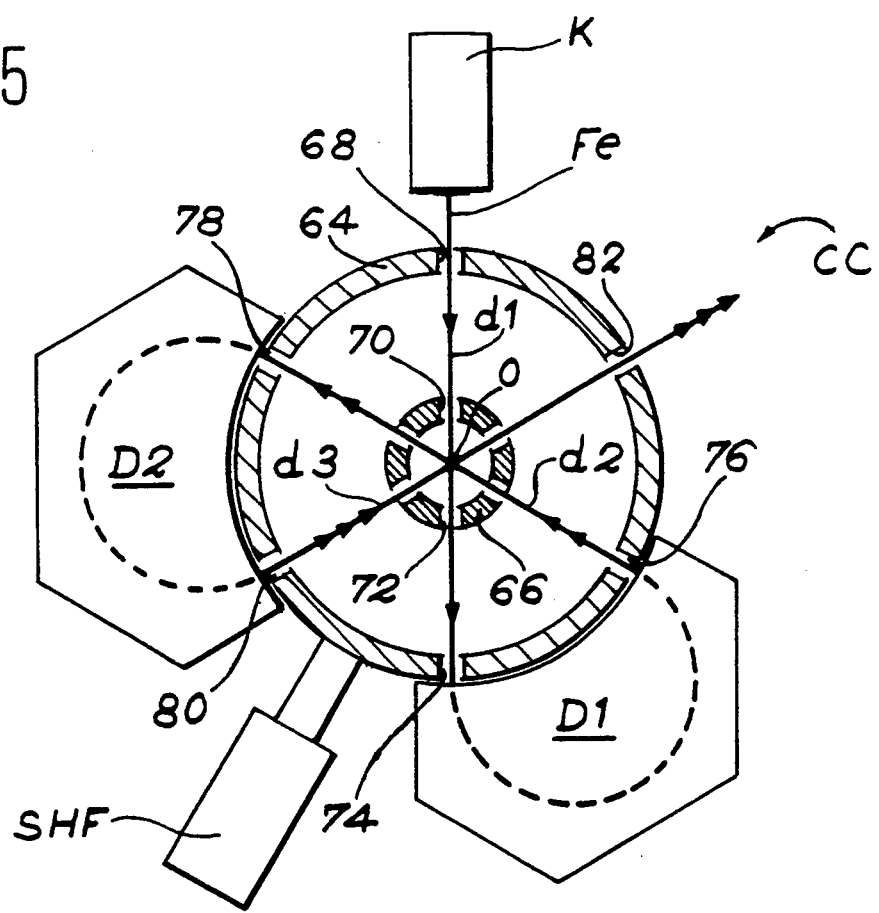
FIG. 5 A diagrammatic view of a high frequency accelerator incorporated into the electrostatic accelerator of FIG. 4.

An embodiment of the Rhodotron 54 usable in the accelerator of FIG. 4 is diagrammatically shown in FIG. 5. It comprises a high frequency source SHF, an electron source K, a coaxial cavity CC and two deflectors D1 and D2. The coaxial cavity CC is formed by an external cylindrical conductor 64 and an internal cylindrical conductor 66. The electron source K emits an electron beam Fe contained in a plane perpendicular to the axis of the coaxial cavity CC. Said plane encounters said axis at a point O, FIG. 5 being a cross-sectional view along said plane. Said beam penetrates the cavity CC by an opening 68 and traverses the cavity CC along a first diameter d1 of the external conductor 64.

The internal conductor 66 has two diametrically opposite openings 70, 72 and which are successively traversed by the beam. The electron beam is accelerated by the electric field if the phase and frequency conditions are satisfied, i.e. said electric field must have the opposite sense to the velocity of the electrons.

The accelerated beam passes out of the coaxial cavity CC through an opening 74 diametrically opposite to the opening 68. It is then deflected by the electron deflector D1. The beam is reintroduced into the cavity CC by an opening 76. It then follows a second diameter d2 and undergoes a second acceleration in the coaxial cavity CC. It passes out through an opening 78 diametrically opposite to the opening 76.

On leaving, the beam is again deflected by the deflector D2 and reintroduced into the coaxial cavity CC by an opening 80. It then follows a third diameter d3 and undergoes a third acceleration, passing out of the coaxial cavity CC by an opening 82 diametrically opposite to the opening 80.

Thus, the Rhodotron can be designed in such a way that the electron beam which it accelerates reenters and leaves the coaxial cavity CC a larger number of times. This is the case with the Rhodotron 54, which is diagrammatically and partly shown in FIG. 4, where the trajectory of the electrons is in the form of a rosette (hence the name of this high frequency accelerator).

FIG. 4 shows that a buncher G can optionally be placed on the trajectory of the beam supplied by the electron source K before said beam penetrates the accelerator 54 for the first time. It is possible to use a tube which is commercially available from N.E.C. (National Electrostatic Corporation - U.S.A.) for producing each of the columns 20, 22 and 56.

Figure 6:
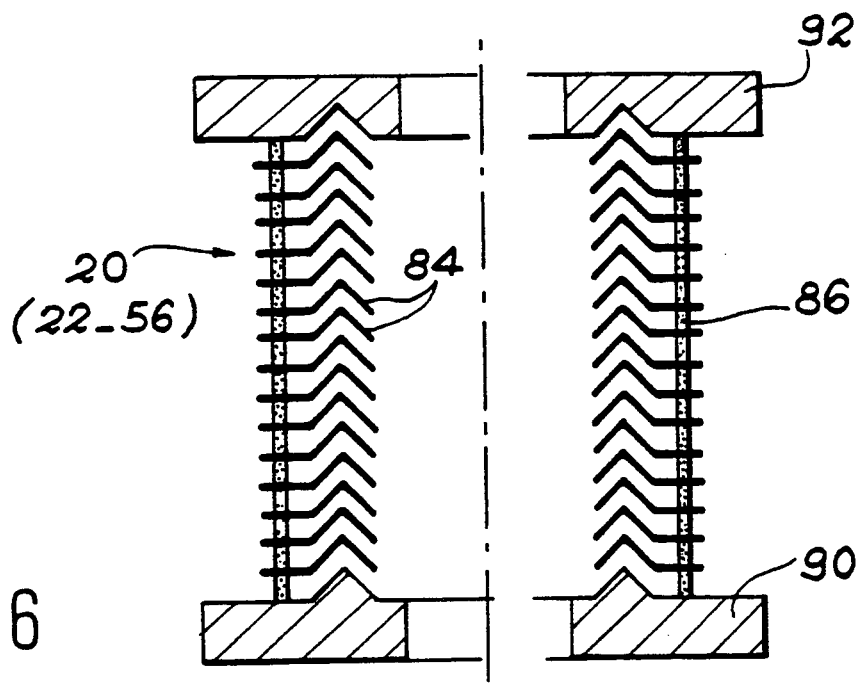
FIGS. 6 & 7 Diagrammatically two embodiments of an accelerating or decelerating tube incorporated in the electrostatic accelerator of FIG. 4.

This tube is diagrammatically shown in FIG. 6 and which comprises internal annular electrodes 84 electrically insulated from one another by tubular, electrically insulating segments 86, the latter being tightly connected to one another. The thus obtained tube has flanges 90 and 92 at its two ends.

Figure 7:
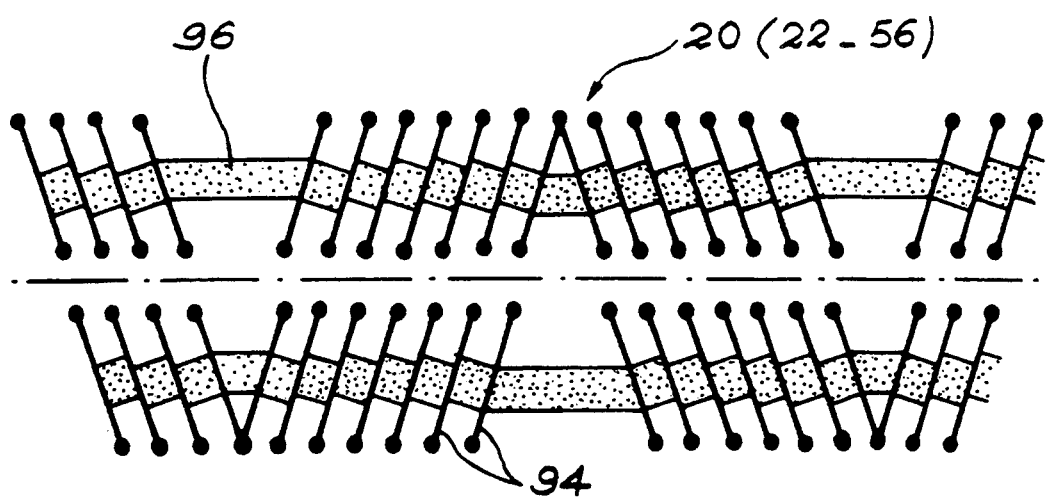

Another known tube, which can also be used for producing each of the columns 20, 22 and 56, is diagrammatically and partly shown in FIG. 7. This tube known as the inclined field tube comprises series of spaced, equipotential, conductive rings 94, whose inclinations alternate and which are interconnected by electrically insulating rings 96, the whole forming a tight assembly.

Figure 8:
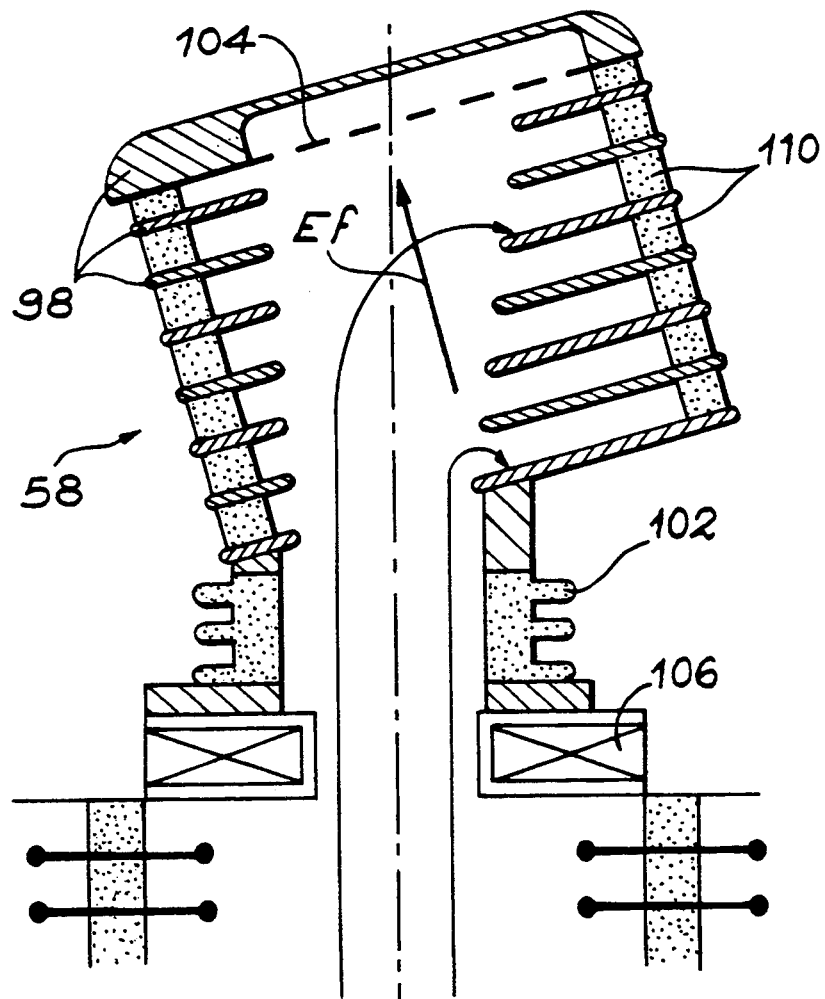
FIG. 8 A diagrammatic view of a special embodiment of an electron collector incorporated into the electrostatic accelerator of FIG. 4.

An embodiment of the collector 58 (which is of the same type as the collector 26) is diagrammatically shown in FIG. 8. This collector 58 has a succession of collecting plates or electrodes 98 separated from one another by electrically insulating rings 110. An electrically insulating tubular element 102 separates the collector 58 from the corresponding decelerating tube 56.

FIG. 8 also shows a grid 104 for repelling the secondary electrons produced in the collector 58 of FIG. 8. It is also possible to see a focussing coil 106 fitted at the outlet of the decelerating tube 56 and which focusses the electron beam on leaving said tube 56 before the beam penetrates the collector 58.

The different plates 98 are raised to appropriate potentials so as to create an electric retarding field Ef, whose direction passes from the first plate (located on the side of the decelerating tube 56) to the last plate (which is the furthest from the decelerating tube 56).

It is pointed out that such a collector structure is known and the polarization of each of the electrodes 98 is chosen so as to bring about an optimum recovery of the energy of all the electrons of the beam from said decelerating tube 58.

The plates 98 are cooled by not shown means, e.g. a circulation of $SF_6$ in a thermally conductive tube welded around each of the plates 98.

Reference has already been made to the similarity of the columns 20, 22 and 56, which are respectively provided for accelerating the main beam, decelerating the main beam (following the use of the latter and prior to the collection of the used beam) and the deceleration of the charging beam.

In a special embodiment of the invention and which is less costly than that shown in FIG. 4, these three columns 20, 22 and 56 are combined into a single column for accelerating the main beam, decelerating the main beam and decelerating the charging beam. This single column is diagrammatically and partly shown in FIG. 9, wherein it carries the reference 108.

Column 108 comprises electrically conductive, parallel plates 110 tightly connected to one another by tubular, electrically insulating elements 112.

Figure 9:
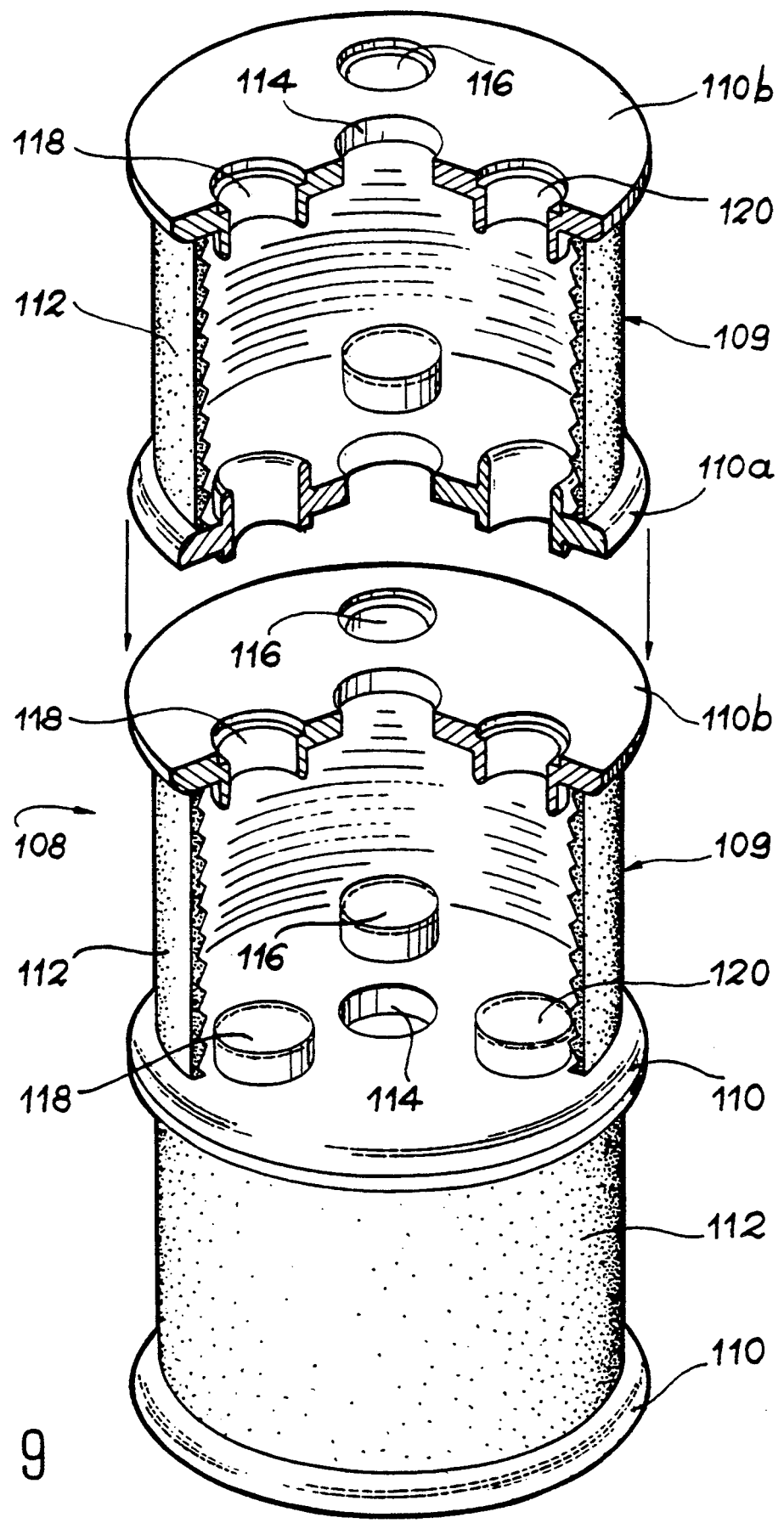
FIG. 9 A diagrammatic, partial view of a multiple beam tube incorporated in an electrostatic accelerator according to the invention.

In the embodiment of FIG. 9, the column 108 is a tight assembly of sections 109, each section 109 incorporating an element 112 and, on either side of the latter, two half-plates 110a and 110b, each plate 110 being the tight assembly of two adjacent half-plates, as can be seen in FIG. 9. The plates 110 and the tubular elements 112 have the same axis constituting the axis of the column 108. Each plate 110 has four openings 114, 116, 118 and 120, all of the openings being in the volume defined by the tubular elements 112. The openings 114 are placed in the center of the plates 110 and all have the same axis as the column 108. These openings 114 are pumping orifices making it possible to form the vacuum in the column 108.

On each plate 110, the openings 116, 118 and 120 are at 120° for one another around the opening 114 of said plate 110. Moreover, the openings 116 of he plates 110 are coaxial and are provided for the passage of the accelerated main beam. The openings 118 of the plates 110 are coaxial and are provided for the passage of the decelerated main beam. The openings 120 of the plates 110 are coaxial and provided for the passage of the decelerated charging beam.

Not shown means are provided for raising the plates or electrodes 110 to potentials appropriate for said accelerations and for said decelerations. These potentials are distributed in know manner, e.g. by means of not shown, strong electrical resistors.

Obviously, the openings 120 respectively located at the two ends of the column 108 are respectively connected to the collector 58 and to the not shown duct supplying the electrons from the high frequency accelerator 54.

The openings 118 respectively located at the two ends of the column 108 are tightly connected respectively to the collectors 26 and to the duct supplying the electrons which have traversed the wiggler 4.

The openings 116 formed on the plates 110 located at the two ends of the column 108 are tightly connected respectively tot he electron gun 24 and to the not shown duct bringing the accelerated electrons to the wiggler 4.

Obviously, it is then possible to use a pumping system common to the three aforementioned beams, said pumping being possible by means of the orifices 114.

A gaseous $SF_6$ atmosphere is provided outside the column 108 (FIG. 9), or outside the columns 20, 22 and 56 (FIG. 4) and also in the high voltage terminal 18.

In the preceding description, the electrostatic accelerator according to the invention has been described in its preferred application to free electron lasers. However, the invention is not limited to this application.

In particular, the electrostatic accelerator according to the invention can be used for:

accelerating strong positive ion currents from a positive ion source at earth potential to a target placed in the high voltage terminal (nuclear physics experiments), accelerating strong negative ion currents from a negative ion source placed in the high voltage terminal to a target raised to earth potential (application to the heating of plasmas in controlled fusion experiments), accelerating strong ion currents using the configuration of tendem accelerators, the high voltage terminal then containing the device for converting the negative ions into positive ions, which is the characteristic of tandem accelerators.

If Er is the energy of the electron beam emitted by the high frequency accelerator (e.g. a Rhodotron) and if the ions to be accelerated are charged n times, the final energy Ei to which said ions can be accelerated is such that:

$$Ei = n \times Er \qquad (1)$$

Typically Er is between 1 and 20 MeV and n can vary from 1 to values higher than 10 as a function of the particular case.

The ion beam to be accelerated can be represented by a pulse sequence of duration t and period T. If Ir represents the man current of the electron beam supplied by the Rhodotron, the peak current Ii of the ion pulses under continuous operating conditions is: Ii=Ir/33 T/t. Typically Ir is approximately 10 to 20 mA.

An accelerator according to the invention using a high frequency electron accelerator has the following advantages for accelerating ions. It is able to accelerate intense ion beams under long pulse operating conditions or even continuous conditions. It makes it possible to obtain high ion energies, as is shown by the relation (1). It makes it possible to compensate voltage variations during ion current pulses. It permits the emission of high power ion beams.

FIGS. 10 to 13 diagrammatically show examples of accelerators according to the invention for accelerating ions. The configuration of these accelerators is dependent on the polarity of the ions to be accelerated (positive or negative ions).

Figure 10:
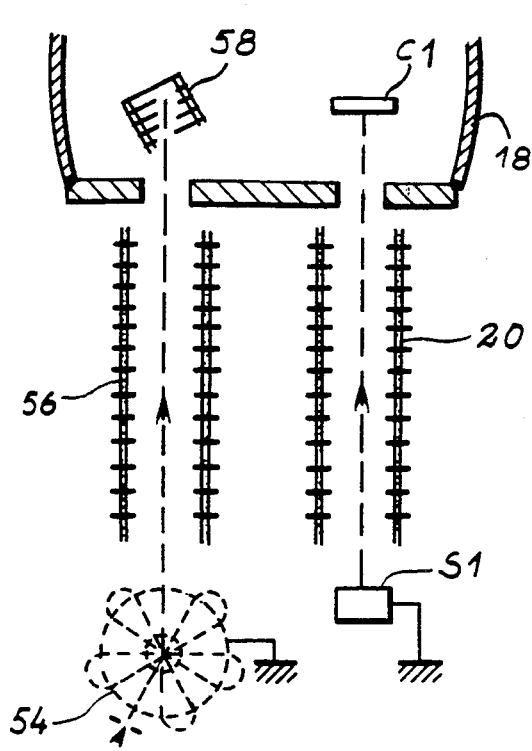
FIGS. 10 to 13 Diagrammatically applications of the invention to the acceleration of ions.

In FIG. 10, use is made of a positive ion source S1 which, like the Rhodotron 54, is earthed or grounded. The accelerating column of the electron beam and the accelerating column of the ion beam respectively carry the references 56 and 20. The electron beam collector 58 and the ion beam receiving target C1 are located in the high voltage terminal 18, which is brought to a negative potential.

Figure 11:
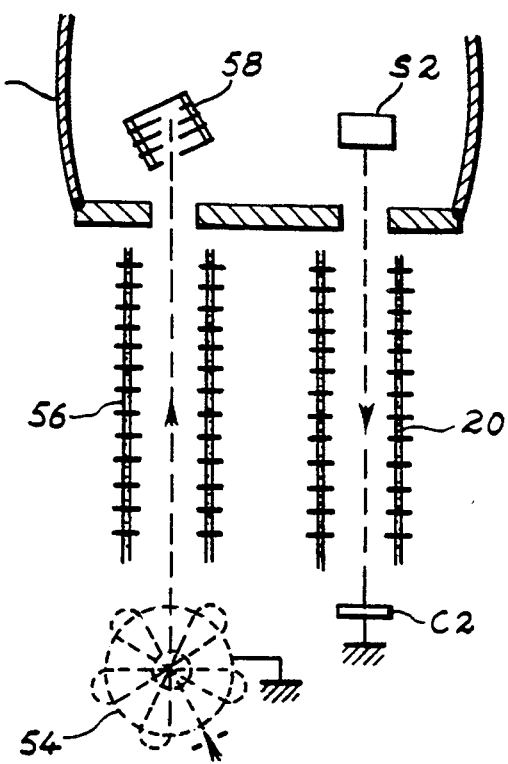

FIG. 11 uses a negative ion source S2. The Rhodotron 54 and the ion beam receiving target C2 are grounded. The electron beam collector 58 and the ion source S2 are located in the high voltage terminal 18, which is brought to a negative potential.

In the preceding examples, a grounded high frequency accelerator has been used. In the examples illustrated in FIGS 12 and 13 use is made of a high frequency accelerator, e.g. a Rhodotron, which is raised to a high voltage and which is thus in the high voltage terminal, whereas the electron beam collector is located outside said terminal.

Figure 12:
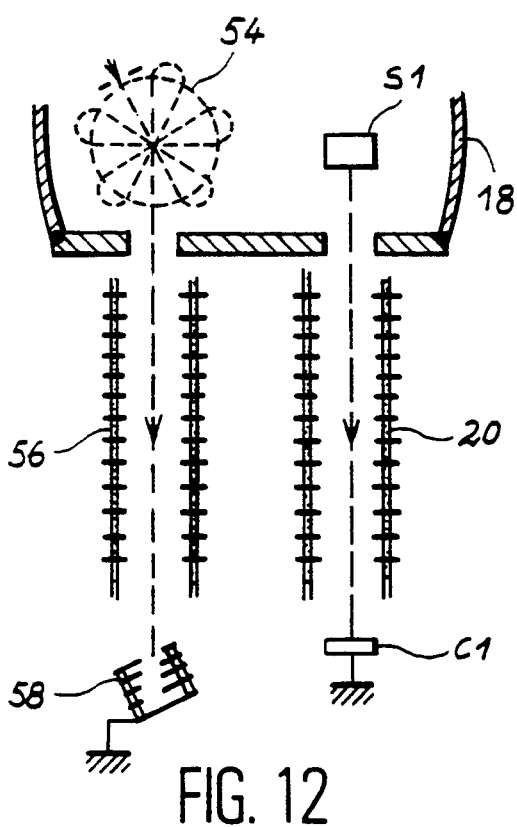

Use is made of a positive ion source S1 in FIG. 12 and said source together with the Rhodotron 54 are located in the high voltage terminal 18, which is raised to a positive potential. The electron beam collector 58 and the ion beam receiving target C1 are grounded.

Figure 13:
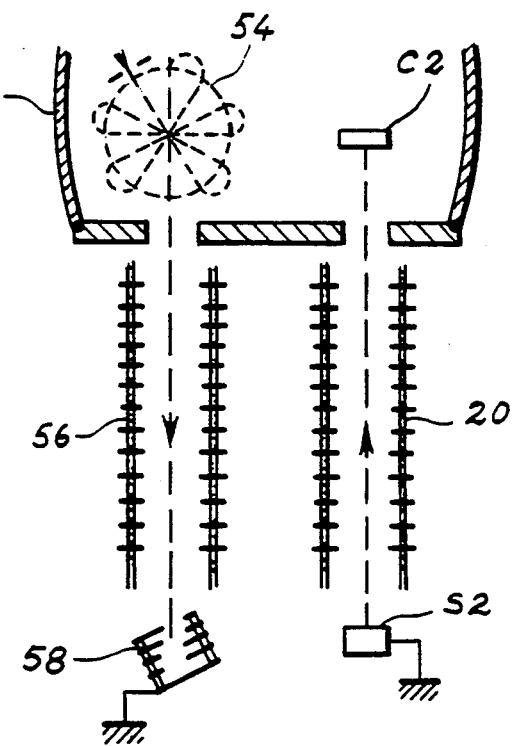

Use is made of a negative ion source S2 in FIG. 13. The Rhodotron 54 and the ion beam receiving target 62 are located in a high voltage terminal 18 raised to a positive potential. The electron beam collector 58 and the ion source S2 are grounded.

In all the hitherto described embodiments use is made of a high frequency electron accelerator, e.g. a Rhodotron. However, in other embodiments of the invention, it would be possible to use a high frequency positive or negative ion accelerator for supplying the charging current.

We claim:

1. Electrostatic accelerator for accelerating charged particles with to a high voltage, comprising:
   an accelerating column (20) having a high voltage end and a low voltage end;
   a high voltage terminal (18) located at said high voltage end of said accelerating column (20);
   electric charge transporting means (54) for charging said high voltage terminal from ground to a high voltage and maintaining said high voltage terminal at said high voltage, by supplying charging current to said high voltage terminal; and
   wherein said charge transporting means comprises a high frequency accelerator for supplying an electrically charged beam to said high voltage terminal.

2. Electrostatic accelerator according to claim 1, wherein the high frequency accelerator is a high frequency electron accelerator (54) able to supply an electron beam, the electric charge transporting means further comprises means (56) for supplying the electron beam to the high voltage terminal (18) in which electrons from said electron beam accumulate, said charging current comprising electrons supplied by said high frequency accelerator (54).

3. Electrostatic accelerator according to claim 2, wherein the high frequency accelerator (54) comprises;
   a structure having a cavity (CC) formed by an external cylindrical conductor (64) and an internal cylindrical conductor (66), which are coaxial to one another,
   a high frequency source (SHF) supplying the cavity (CC) with an electromagnetic field having a radial component, at a resonant frequency of the cavity, the radial component of the field having a maximum in at least one plane perpendicular to an axis that is common to the external conductor (64) and the internal conductor (66), said external and internal conductors of the cavity having diametrically opposite openings located in a plane that is perpendicular to said axis for the introduction of the electron beam into the cavity (CC) and for its extraction in said plane, and
   at least one electron deflector (D1, D2) for deflecting the electron beam which has traversed the cavity along a diameter, while keeping it in the plane and then re-injecting it into the cavity along another diameter.

4. Electrostatic accelerator according to claim 2, wherein the electron beam supply means incorporates a column (56) for decelerating the electrons from the high frequency accelerator (54).

5. Electrostatic accelerator according to claim 4, further comprising means for recovering electrons which it has accelerated, said means for recovering comprising a column for decelerating said electrons, wherein the accelerating column, the decelerating column incorporated in the supply means and the decelerating column incorporated into the recovery means, have the same structure and wherein the electrostatic accelerator comprises a single tube in which the three columns are grouped, the three columns providing the functions of accelerating electrons to be supplied by said electrostatic accelerator, for the deceleration of electrons from the high frequency accelerator, and for the deceleration of electrons which have been accelerated by the accelerator.

6. Electrostatic accelerator according to claim 5, wherein the recovering means comprises means for recovering electrons which have traversed a magnetic wiggler, wherein the decelerating column is incorporated in said recovery means and communicates with the magnetic wiggler.

7. Electrostatic accelerator according to claim 4, further comprising a source (S1) of positive ions for acceleration by the accelerating column (20), wherein the high frequency accelerator and the ion source are grounded, and the high voltage terminal is at a negative potential.

8. Electrostatic accelerator according to claim 4, further comprising a source (S2) of negative ions for acceleration by the accelerating column (20), said source of negative ions being in the high voltage terminal (18), the high voltage terminal being at a negative potential, the high frequency accelerator being grounded.

9. Electrostatic accelerator according to claim 2, further comprising means for recovering electrons which have been accelerated, said recovery means incorporating a column (22) for decelerating the electrons.

10. Electrostatic accelerator according to claim 5, wherein the recovery means comprises means for recovering electrons which have traversed a magnetic wiggler (4), wherein the decelerating column (22) is incorporated in said recovery means and is in communication with the magnetic wiggler (4).

11. Electrostatic accelerator according to claim 1, wherein the high frequency in the high voltage terminal and able to supply an electron beam, the electron beam providing said charging current, wherein the electrostatic accelerator also comprises means for collecting the electron beam, said means for collecting being grounded and wherein the transport means also incorporates a column for decelerating the electrons from the high frequency accelerator in order to bring them to the collecting means.

12. Electrostatic accelerator according to claim 11, further comprising a source of ions to be accelerated by the accelerating column.

13. Free electron laser, comprising an electron electrostatic accelerator for supplying an electron beam, and a magnetic wiggler (4) traversed by said electron beam, wherein said electrostatic accelerator comprises:
an accelerating column (20) having a high voltage end and a low voltage end;
a high voltage terminal (18) located at said high voltage end of said accelerating column (20);
electric charge transporting means (54) for charging said high voltage terminal from ground to a high voltage and maintaining said high voltage terminal at said high voltage, by supplying charging current to said high voltage terminal;
wherein said charge transporting means comprises a high frequency accelerator for supplying an electrically charged beam to said high voltage terminal;
wherein the high frequency accelerator is a high frequency electron accelerator (54) able to supply an electron beam, the electric charge transport means comprises means (56) for supplying the electron beam to the high voltage terminal (18) in which electrons from said electron beam accumulate, said charging current comprising electrons supplied by said high frequency accelerator (54).

* * * * *